United States Patent [19]

Kim

[11] Patent Number: 6,065,700
[45] Date of Patent: *May 23, 2000

[54] ACTUATOR ASSEMBLY FOR MAGNETIC BRAKE ON A FISHING REEL

[75] Inventor: Hyunkyu Kim, Broken Arrow, Okla.

[73] Assignee: Brunswick Corporation, Tulsa, Okla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/680,013

[22] Filed: Jul. 15, 1996

[51] Int. Cl.$^7$ .................................................. A01K 89/02
[52] U.S. Cl. .......................................... 242/288; 188/267
[58] Field of Search ..................................... 242/288, 302, 242/303; 188/267, 161; 310/77, 103

[56] References Cited

U.S. PATENT DOCUMENTS

| 4,585,183 | 4/1986 | Puryear | 242/288 |
| 4,807,827 | 2/1989 | Welch . | |
| 4,830,308 | 5/1989 | Puryear | 242/84.52 |
| 5,108,042 | 4/1992 | Puryear et al. | 242/288 |
| 5,273,235 | 12/1993 | Sato | 242/288 |
| 5,362,010 | 11/1994 | Takamatsu | 242/261 |

FOREIGN PATENT DOCUMENTS

| 5-23871 | of 0000 | Japan . | |
| 59-2643 | of 0000 | Japan . | |
| 6-276902 | of 0000 | Japan . | |
| 73476 | 5/1983 | Japan | 242/288 |

Primary Examiner—Donald P. Walsh
Assistant Examiner—Emmanuel M. Marcelo
Attorney, Agent, or Firm—Wood, Phillips, VanSanten, Clark & Mortimer

[57] ABSTRACT

A fishing reel having a frame and an operating mechanism for the fishing reel on the frame. The operating mechanism has a line carrying spool mounted to the frame for rotation relative to the frame around a first axis to retrieve line onto the fishing reel. The operating mechanism further has a magnetic brake assembly that cooperates with the spool. The operating mechanism further has an actuator assembly for selectively moving at least a part of the magnetic brake assembly in a path towards the spool to a first position and away from the spool to a second position. The actuator assembly has first and second cam surfaces and an actuator that is movable relative to the frame between third and fourth positions to thereby cause the first and second cam surfaces to be moved guidingly against and relative to each other as an incident of which the brake assembly is caused to move towards and away from the spool. The actuator assembly causes the brake assembly to move from the first position into the second position as an incident of the actuator moving from the third position into the fourth position and causes the brake assembly to move from the second position into the first position as an incident of the actuator moving from the fourth position into the third position. The first and second cam surfaces are configured so that as the actuator is moved at a constant rate between the third and fourth positions, the at least part of the brake assembly moves at a non-constant rate over at least part of the path between the first and second positions.

17 Claims, 2 Drawing Sheets

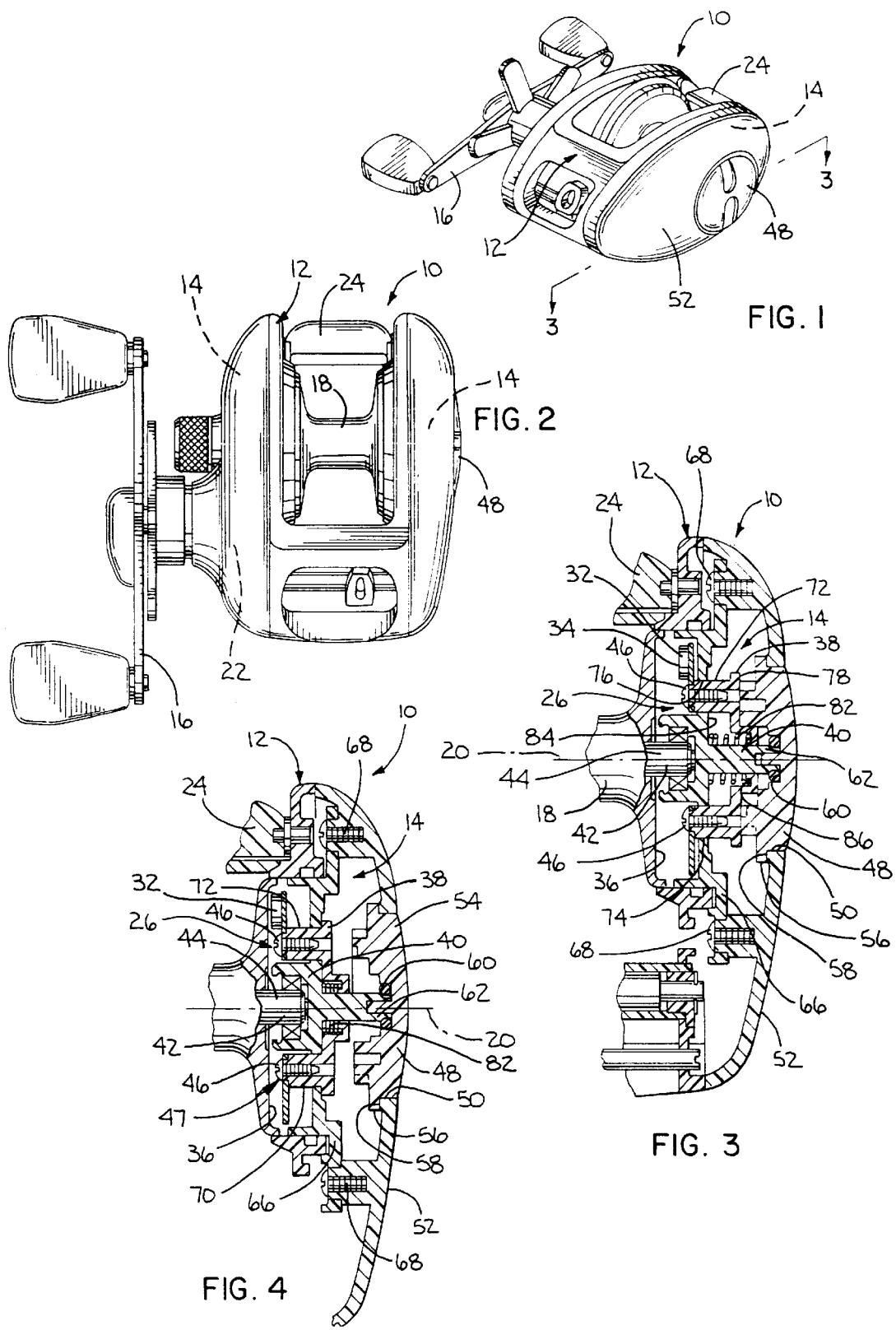

ACTUATOR ASSEMBLY FOR MAGNETIC BRAKE ON A FISHING REEL

BACKGROUND OF THE INVENTION

1. Field of the Invention

This invention relates to fishing reels of the type utilizing a magnetic spool brake and, more particularly, to an actuator assembly for moving a least part of the brake assembly selectively towards and away from the spool.

2. Background Art

In a baitcast-type fishing reel, a line carrying spool is mounted for rotation upon a frame. A crank handle is operable to rotate the spool through a drive connection to thereby retrieve line onto the reel. By operating an actuator, the user can disengage the drive connection to place the reel in a cast state, wherein the spool is freely rotatable. To effect a cast, the user thrusts the rod so that the weight of the bait causes the line to pay out. One problem that is common with this type of reel is that as the rod is initially thrust, the speed of the spool may exceed the rate of line payout. As a consequence, the line will "backlash" or a "bird's nest" will be developed in the line supply on the spool. This requires that the user stop fishing and manually untangle the line on the spool. Even the most experienced fisherman may experience this difficulty.

To control the "backlashing" problem, it is known to incorporate a magnetic braking system, as shown for example in U.S. Pat. No. 4,830,308, to Puryear. In this structure, a pivotable actuator is operable to move magnets selectively towards and away from the spool.

One problem with conventional brake assemblies of the type shown in Puryear is that with the magnets fully retracted away from the spool, the magnets may be in close enough proximity to the spool that they still produce a braking effect.

SUMMARY OF THE INVENTION

In one form of the invention, a fishing reel is provided having a frame and an operating mechanism for the fishing reel on the frame. The operating mechanism has a line carrying spool mounted to the frame for rotation relative to the frame around a first axis to retrieve line onto the fishing reel. The operating mechanism further has a magnetic brake assembly that cooperates with the spool. The operating mechanism further has an actuator assembly for selectively moving at least a part of the magnetic brake assembly in a path towards the spool to a first position and away from the spool to a second position. The actuator assembly has first and second cam surfaces and an actuator that is movable relative to the frame between third and fourth positions to thereby cause the first and second cam surfaces to be moved guidingly against and relative to each other as an incident of which the brake assembly is caused to move towards and away from the spool. The actuator assembly causes the brake assembly to move from the first position into the second position as an incident of the actuator moving from the third position into the fourth position and causes the brake assembly to move from the second position into the first position as an incident of the actuator moving from the fourth position into the third position. The first and second cam surfaces are configured so that as the actuator is moved at a constant rate between the third and fourth positions, the at least part of the brake assembly moves at a non-constant rate over at least part of the path between the first and second positions.

In one form, at least one of the first and second cam surfaces has a step thereon, which upon being travelled over by the other of the first and second cam surfaces causes the brake assembly to move at the non-constant rate.

In one form, at least part of the brake assembly moves substantially parallel to the first axis between the first and second positions.

In one form, the actuator is pivotable about an axis between the third and fourth positions.

In one form, one of the first and second cam surfaces has first and second circumferential ends, the other of the first and second cam surfaces has third and fourth circumferential ends, and the at least part of the brake assembly moves at the non-constant rate as one of the first and second circumferential ends travels over one of the third and fourth circumferential ends.

In one form, at least part of the brake assembly moves at a first rate from the first position to a predetermined position between the first and second positions and at a second rate between the predetermined position and the second position, with the second rate being greater than the first rate.

The at least part of the brake assembly may be normally biased towards the second position.

In one form, the actuator assembly has third and fourth cam surfaces that are movable guidingly against and relative to each other as the actuator moves between the third and fourth positions.

The cam surfaces may have an arcuate shape as viewed in cross section taken transversely to the first axis with the diameter of each of the first and third cam surfaces being less than the diameter of each of the second and fourth cam surfaces.

In another form of the invention, a fishing reel is provided having a frame and an operating mechanism for the fishing reel on the frame. The operating mechanism has a line carrying spool mounted to the frame for rotation relative to the frame around a first axis to retrieve line onto the spool. The operating mechanism has a magnetic brake assembly that cooperates with the spool. The operating mechanism has an actuator assembly for selectively moving at least a part of the magnetic brake assembly in a path towards the spool to a first position and away from the spool to a second position. The actuator assembly includes an actuator that is movable relative to the frame between third and fourth positions, a first surface on the actuator, and a second surface on the at least part of the brake assembly. The first and second surfaces are movable guidingly against and relative to each other to cause the at least part of the brake assembly to move between the first and second positions as the actuator moves between the third and fourth position. There is a step on one of the first and second surfaces.

In one form, the at least one of the first and second surfaces has a length and a first pitch over part of the length of the at least one of the first and second surfaces and at least part of the step has a pitch that is different than the first pitch.

In one form, the other of the first and second surfaces moves over the step as the actuator moves into the fourth position and the at least part of the brake assembly moves into the second position.

In one form, there is a third surface on the actuator and a fourth surface on the at least part of the brake assembly, with the third and fourth surfaces being movable guidingly against and relative to each other to cause the at least part of the brake assembly to move between the first and second positions as the actuator moves between the third and fourth positions.

There may be a step on one of the third and fourth surfaces, with the other of the first and second surfaces travelling over the step on the one of the first and second surfaces as the other of the third and fourth surfaces travels over the step on the one of the third and fourth surfaces.

In one form, the first and third surfaces each reside radially inside of the second and fourth surfaces relative to the frame axis.

BRIEF DESCRIPTION OF THE DRAWINGS

FIG. 1 is a perspective view of a bait cast fishing reel having an actuator assembly for a magnetic brake assembly, according to the present invention, incorporated therein;

FIG. 2 is an enlarged, plan view of the fishing reel in FIG. 1;

FIG. 3 is an enlarged, fragmentary, cross-sectional view of the fishing reel taken along line 3—3 of FIG. 1 and showing the brake assembly in the full off position;

FIG. 4 is a view as in FIG. 3 with the brake assembly in the on position;

DETAILED DESCRIPTION OF THE DRAWINGS

Figure 5:
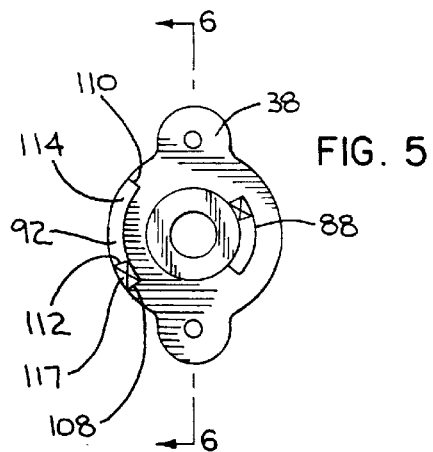
FIG. 5 is an enlarged, side elevation view of a part of the brake assembly that is movable towards and away from the spool.
Figure 6:
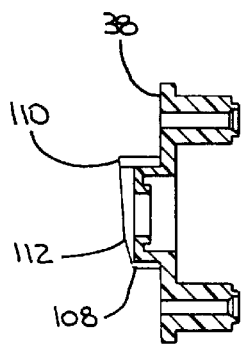
FIG. 6 is an enlarged, cross-sectional view of the brake assembly part taken alone line 6—6 of FIG. 5.
Figure 7:
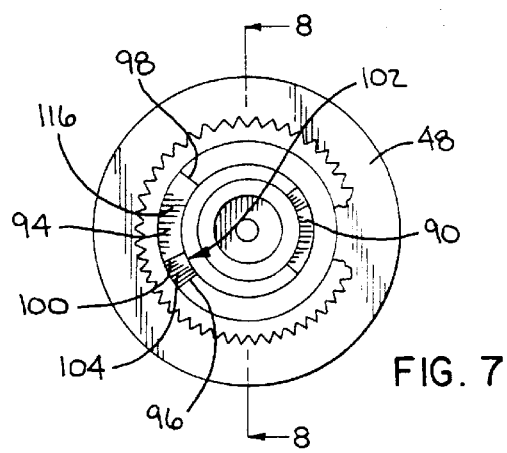
FIG. 7 is an enlarged, side elevation view of an actuator for the brake assembly taken from the side opposite that in FIG. 5.

The present invention is shown incorporated into a baitcast-type fishing reel 10, as shown in FIGS. 1–4. The fishing reel 10 has a frame 12 upon which an operating mechanism at 14 is mounted.

The basic operating mechanism 14 for the fishing reel 10 does not need to be discussed in detail for an understanding of the present invention. Briefly, the operating mechanism 14 includes a crank handle 16 which is rotatable to drive a metal spool 18 around a laterally extending axis 20 to thereby retrieve line onto the spool 18. The crank handle 16 imparts rotation to the spool 18 through a conventional type drive connection 22, of the type shown in U.S. Pat. No. 4,807,827, incorporated herein by reference.

By depressing an actuator 24, the reel 10 is changed from a retrieve state to a cast state. In the cast state, the drive connection 22 is disengaged, whereupon the spool 18 is freely rotatable about the axis 20 to allow payout of line.

The present invention is concerned with a brake assembly at 26, as shown in FIGS. 3 and 4, with details thereof shown in FIGS. 5–9. The brake assembly 26 includes an annular plate 30 carrying a plurality of disk-shaped magnets 32, each having a flat face 34 designed to be facially presented to a laterally/axially facing flat surface 36 on the spool 18. The plate 30 is secured to a part 38 which surrounds and is guidable laterally relative to a stepped, bearing element 40 which receives and supports one end 42 of a shaft 44 on the spool 18. The plate 30 is secured to the part 38 by screws 46 and defines a movable subassembly 47.

Both the part 38 and bearing element 40 cooperate with an actuator 48 for the brake assembly 26. The actuator 48 extends through an opening 50 in a cup-shaped cover plate 52. The opening 50 is concentric with the spool 18. The actuator 48 has a stepped outer surface with a small diameter portion 54 and a large diameter portion 56. The small diameter portion 54 is closely received in the opening 50 so that the actuator 48 is guided in rotation around the axis 20 by the cover plate 52. With the actuator 48 assembled from left to right in FIGS. 3 and 4 through the opening 50, the large diameter portion 56 abuts to an inside surface 58 on the cover plate 52. A cup-shaped, laterally inwardly opening receptacle 60 is defined by the actuator 48 for the end 62 of the bearing element 40.

A reinforcing plate 66 is fixedly attached to the cover plate 52 through screws 68 and both maintains the subassembly 47 in an operative position and guides movement thereof relative to the frame 12 between a first position, as shown in FIG. 4, representing the full "on" position, and a second position, shown in FIG. 3, representing the full "off" position. The part 38 has diametrically opposite posts 70, 72 which extend through and move within openings 74, 76 in the reinforcing plate 66 as the subassembly 47 moves relative to the reinforcing plate 66 between its on and off positions. The part 38 has an enlarged rim 78 which abuts to the reinforcing plate 66 to limit right to left movement of the part 38 in FIGS. 3 and 4 to the full on position in FIG. 4. The plate 30 is attached to the posts 70, 72 with the posts 70, 72 directed through the openings 74, 76 so that the reinforcing plate 66 is captive between the rim 78 and the reinforcing plate 30.

A coil spring 82 surrounds the bearing element 40 and acts between a laterally outwardly facing surface 84 on the bearing element 40 and a laterally inwardly facing surface 86 on the part 38 to thereby normally bias the plate 38 and subassembly 47 towards the second/off position.

According to the invention, a first laterally outwardly facing cam surface 88 is provided on the part 38 to cooperate with a second, laterally inwardly facing cam surface 90 on the actuator 48. A third laterally outwardly facing cam surface 92 is provided on the part 38 to cooperate with a fourth, laterally inwardly facing cam surface 94 on the actuator 48. The cam surfaces 88, 90, 92, 94 are configured so that pivoting of the actuator 48 in one direction to a third position causes the subassembly to assume its first position and pivoting of the actuator 48 oppositely from the third position to a fourth position causes the subassembly 47 to assume its second position. Since the cam surfaces 88, 90 and 92, 94 cooperate in the same fashion, the description herein will be limited to the exemplary cam surface pair 92, 94.

The cam surface 94 is arcuate and elongate with circumferential ends 96, 98. The surface 94 projects progressively laterally inwardly from the end 96 to the end 98. The pitch of the surface 94 is constant between a first location 100 and the end 98. Between the first location 100 and the end 96, a step 102 is formed. The step 102 is defined by a portion 104, with a pitch equal to the pitch of the surface 94 between the location 100 and the end 98, and a more steeply pitched transition portion 106 between the portion 104 and the first location 100.

The cooperating cam surface 92 projects progressively radially outwardly from one circumferential end 108 to the opposite circumferential end 110. The pitch between the end 110 and a second location 112 is constant and substantially equal to the pitch between the first location 100 and the end 98 of the cam surface 94, with the pitch of the surface 92 between the second location 112 and the end 108 being constant and steeper than the pitch between the end 110 and the second location 112, and preferably equal to the pitch of the transition portion 106 on the surface 94.

With this arrangement, by pivoting the actuator 48 in a counterclockwise direction from the FIG. 1 perspective with the actuator 48 in the third position, the surface portion 114 on the part 38 between the second location 112 and the end 110 is guided against the surface portion 116 between the first location 100 and the end 98 on the actuator 48 to progressively allow the subassembly 47 to move from the FIG. 4/on position towards the FIG. 3/off position under the force of the spring 82. Upon realizing the FIG. 3 position, a surface portion 117 between the second location 112 and end 108 travels over and drops into the step 102 and against the portion 104 to result in an instantaneous axial shift of the part 38. As this occurs, the surface portion 117 facially abuts to the transition portion 106.

Figure 8:
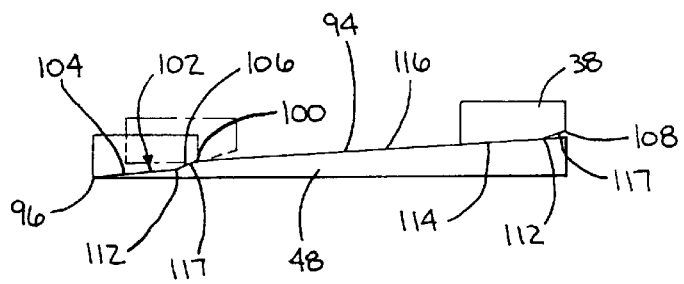
FIG. 8 is an enlarged, schematic representation of cooperating cam surfaces on the actuator and movable brake assembly part shown in on and off positions and in transition to the off position in phantom lines.
Figure 9:
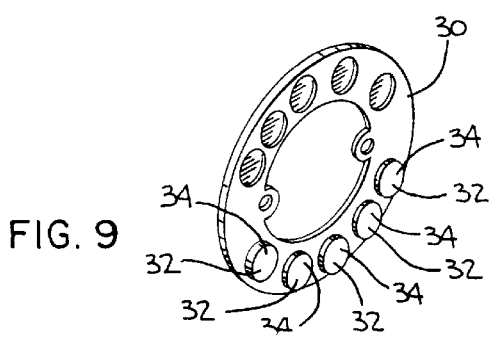
FIG. 9 is an enlarged, perspective view of a magnet carrying plate that is mounted to and movable with the brake assembly part in FIGS. 5 and 6.

That is, as the actuator 48 is pivoted at a constant rate, the subassembly 47 moves laterally from the on position towards its off position at a constant rate. With the actuator 48 pivoting at this constant rate, the subassembly 47 shifts laterally at a faster rate upon the surface portion 117 travelling over the step 102, as shown in FIG. 8, on the left side thereof With this arrangement, the subassembly 47 instantly backs laterally off an additional increment as it realizes the second position, and can be designed to thereby fully nullify the magnetic effect on the spool 18. The user can effect the same movement of the actuator 48 as with conventional cam arrangements and, by reason of the step 102, realize a "fully off" state for the brake assembly 26 without any additional pivoting movement of the actuator 48.

The cam surfaces 88, 90 are constructed in the same fashion as the cam surfaces 92, 94, including multiple pitch surface portions and a step. The cam surfaces 88, 90 are diametrically opposite to the cam surfaces 92, 94 to thereby maintain the subassembly 47 in a position wherein the faces 34 of the magnets 32 are parallel to the flat spool surface 36 with which they cooperate. The cam surfaces 88, 90 have a diameter less than the cam surfaces 92, 94 to avoid interference between the surfaces 88, 90, 92, 94 as the actuator 48 is pivoted.

The foregoing disclosure of specific embodiments is intended to be illustrative of the broad concepts comprehended by the invention.

What is claimed is:

1. A fishing reel comprising:

a frame; and an operating mechanism for the fishing reel on the frame, said operating mechanism comprising a line carrying spool mounted to the frame for rotation relative to the frame around a first axis to retrieve line onto the fishing reel, said operating mechanism further comprising a magnetic brake assembly that cooperates with the spool, said operating mechanism further comprising an actuator assembly for selectively moving at least a part of the magnetic brake assembly in a path towards the spool to a first position and away from the spool to a second position to thereby vary a braking effect produced by the magnetic brake assembly on the spool, said actuator assembly comprising first and second cam surfaces and an actuator that is movable relative to the frame between third and fourth positions to thereby cause the first and second cam surfaces to be moved guidingly against and relative to each other as an incident of which the at least part of the magnetic brake assembly is caused to move towards and away from the spool, said actuator assembly causing the at least part of the magnetic brake assembly to move from the first position into the second position as an incident of the actuator moving from the third position into the fourth position and causing the at least part of the magnetic brake assembly to move from the second position into the first position as an incident of the actuator moving from the fourth position into the third position, said first and second cam surfaces being configured so that as the actuator is moved at a constant rate between the third and fourth positions, the at least part of the magnetic brake assembly moves at a non-constant rate over at least part of the path between the first and second positions, said first and second cam surfaces being configured so that as the actuator is moved at a constant rate between the third and fourth positions, the at least part of the magnetic brake assembly moves at a first rate from the first position to a predetermined position between the first and second positions and at a second rate between the predetermined position and the second position, said second rate being greater than the first rate, wherein the at least part of the magnetic brake assembly is biased towards the second position for the at least part of the magnetic brake assembly.

2. The fishing reel according to claim 1 wherein at least one of the first and second cam surfaces has a step thereon which upon being traveled over by the other of the first and second cam surfaces, as an incident of the actuator moving at the constant rate, causes the at least part of the magnetic brake assembly to move at the second rate.

3. The fishing reel according to claim 1 wherein the at least part of the brake assembly, in moving between the first and second positions, moves substantially parallel to the first axis.

4. The fishing reel according to claim 3 wherein the actuator, in moving between the third and fourth positions, is pivotable about the first axis.

5. The fishing reel according to claim 4 wherein one of the first and second cam surfaces has first and second circumferential ends, the other of the first and second cam surfaces has third and fourth circumferential ends, and the at least part of the brake assembly moves at the non-constant rate as one of the first and second circumferential ends travels over one of the third and fourth circumferential ends.

6. The fishing reel according to claim 1 wherein the actuator assembly comprises third and fourth cam surfaces that are movable guidingly against and relative to each other as the actuator moves between the third and fourth positions.

7. The fishing reel according to claim 6 wherein the cam surfaces have an arcuate shape with a diameter as viewed in cross section taken transversely to the first axis and the diameter of each of the third and fourth cam surfaces is less than the diameter of each of the first and second cam surfaces.

8. The fishing reel according to claim 1 wherein the magnetic brake assembly has an on position wherein a maximum braking effect is produced by the magnetic brake assembly on the spool and an off position wherein substantially no braking effect is produced by the magnetic brake assembly on the spool, with the at least part of the magnetic brake assembly in the first position the magnetic brake assembly is in the on position, and with the at least part of the magnetic brake assembly in the second position, the magnetic brake assembly is in the off position.

9. A fishing reel comprising:

a frame; and an operating mechanism for the fishing reel on the frame, said operating mechanism comprising a line carrying spool mounted to the frame for rotation relative to the frame around a first axis to retrieve line onto the fishing reel, said operating mechanism further comprising a magnetic brake assembly that cooperates with the spool, said operating mechanism further comprising an actuator assembly for selectively moving at least part of the magnetic brake assembly in a path towards the spool to a first position and away from the spool to a second position to thereby vary a braking effect produced by the magnetic brake assembly on the spool, said actuator assembly comprising an actuator that is movable relative to the frame between third and fourth positions, there being a first surface on the actuator and a second surface on the at least part of the brake assembly, said first and second surfaces being movable guidingly against and relative to each other to cause the at least part of the brake assembly to move from the first position into the second position as the actuator moves from the third position into the fourth position, there being a step on one of the first and second surfaces over which the other of the first and second surface travels as the actuator moves between the third and fourth positions, the one of the first and second surfaces having a length and a first pitch over part of the length of the one of the first and second surfaces and at least part of the step having a second pitch that is different from the first pitch, the other of the first and second surfaces moving over the step as the actuator moves into the fourth position and the at least part of the brake assembly moves into the second position away from the spool and having first and second surface portions with a third pitch on the first surface portion that is substantially the same as the first pitch and a fourth pitch on the second surface portion that is substantially the same as the second pitch, wherein the magnetic brake assembly has an on position wherein a maximum braking effect is produced by the magnetic brake assembly on the spool and an off position wherein substantially no braking effect is produced by the magnetic brake assembly on the spool, with the at least part of the magnetic brake assembly in the first position the magnetic brake assembly is in the on position, and with the at least part of the magnetic brake assembly in the second position, the magnetic brake assembly is in the off position, wherein with the magnetic brake assembly in the off position the first surface facially abuts the first surface portion and the second surface facially abuts the second surface portion.

10. The fishing reel according to claim 9 wherein the actuator, in moving between the third and fourth positions, is pivotable around an axis that is substantially parallel to the first axis.

11. The fishing reel according to claim 10 wherein the at least part of the brake assembly is movable between the first and second positions along an axis substantially parallel to the first axis.

12. The fishing reel according to claim 9 wherein there is a third surface on the actuator and a fourth surface on the at least part of the brake assembly, said third and fourth surfaces being movable guidingly against and relative to each other to cause the at least part of the brake assembly to move between the first and second positions as the actuator moves between the third and fourth positions.

13. The fishing reel according to claim 12 wherein there is a step on one of the third and fourth surfaces over which the other of the third and fourth surfaces travels as the actuator moves between the third and fourth positions.

14. The fishing reel according to claim 13 wherein the other of the first and second surfaces travels over the step on the one of the first and second surfaces as the other of the third and fourth surfaces travels over the step on the one of the third and fourth surfaces.

15. The fishing reel according to claim 9 wherein the at least part of the brake assembly is normally biased towards the second position.

16. The fishing reel according to claim 9 wherein the third and fourth surfaces each reside radially inside each of the first and second surfaces relative to the first axis.

17. The fishing reel according to claim 9 wherein the at least part of the magnetic brake assembly is biased towards the second position for the at least part of the magnetic brake assembly.

* * * * *